United States Patent
Maeda et al.

(10) Patent No.: US 8,284,273 B2
(45) Date of Patent: Oct. 9, 2012

(54) IMAGER FOR PHOTOGRAPHING A SUBJECT WITH A PROPER SIZE

(75) Inventors: Hirokazu Maeda, Tokyo (JP); Hiroyuki Tanaka, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 221 days.

(21) Appl. No.: 12/630,060

(22) Filed: Dec. 3, 2009

(65) Prior Publication Data
US 2010/0149383 A1  Jun. 17, 2010

(30) Foreign Application Priority Data
Dec. 17, 2008  (JP) ................. 2008-321595

(51) Int. Cl.
*H04N 5/262* (2006.01)
*G03B 13/00* (2006.01)

(52) U.S. Cl. ............................ 348/240.1; 348/247

(58) Field of Classification Search ............ 348/333.01, 348/207.99, 345, 240.3, 240.99, 240.1, 240.2, 348/347; 396/60
See application file for complete search history.

(56) References Cited

U.S. PATENT DOCUMENTS

| | | | |
|---|---|---|---|
| 7,450,155 B2 * | 11/2008 | Nakanishi et al. | 348/208.5 |
| 7,720,369 B2 * | 5/2010 | Nose | 396/77 |
| 8,120,664 B2 * | 2/2012 | Nozaki et al. | 348/222.1 |
| 2002/0118964 A1 * | 8/2002 | Enomoto | 396/60 |
| 2005/0270399 A1 | 12/2005 | Kawaguchi et al. | |
| 2007/0146528 A1 * | 6/2007 | Yanagi | 348/333.01 |
| 2008/0205869 A1 * | 8/2008 | Nose | 396/77 |
| 2009/0245770 A1 | 10/2009 | Uenaka | |
| 2009/0245771 A1 | 10/2009 | Uenaka | |
| 2009/0245773 A1 | 10/2009 | Uenaka | |
| 2009/0245774 A1 | 10/2009 | Uenaka | |
| 2009/0251551 A1 | 10/2009 | Uenaka | |
| 2010/0039535 A1 | 2/2010 | Maeda | |

FOREIGN PATENT DOCUMENTS

| | | |
|---|---|---|
| JP | 2005-348181 | 12/2005 |
| JP | 2006-208443 | 8/2006 |

* cited by examiner

*Primary Examiner* — Chieh M Fan
*Assistant Examiner* — Ahmed A Berhan
(74) *Attorney, Agent, or Firm* — Greenblum & Bernstein, P.L.C.

(57) ABSTRACT

An imager is provided having an image-capturing device, a display, and a view angle controller. The image-capturing device captures a subject image and outputs an image signal. The display displays a through image consisting of multiple images continuously displayed. The view angle controller controls a view angle of an image so that a ratio of an area of a subject in an area of an image is maintained at a certain value when the display displays a through image.

19 Claims, 14 Drawing Sheets

WHEN BEST FRAMING MODE IS SELECTED

WHEN COMPOSITION MODE IS DECIDED

SUBJECT APPROACHES DIGITAL CAMERA

SUBJECT RECEDES FROM DIGITAL CAMERA

US 8,284,273 B2

IMAGER FOR PHOTOGRAPHING A SUBJECT WITH A PROPER SIZE

BACKGROUND OF THE INVENTION

1. Field of the Invention

The present invention relates to an imager that photographs a subject at a proper size that is desired by a user.

2. Description of the Related Art

A camera comprising an autofocus device that automatically focuses on a subject and a face position-detecting circuit that automatically determines the position of a face on an image is disclosed in Japanese Unexamined Patent Publication (KOKAI) No. 2006-208443. Additionally, a camera may adjust a view angle so that the size of a subject in an image is adjusted to a predetermined size, and display a through image on a display.

The camera having such functions adjusts its focus and view angle on a face detected by the face position-detecting circuit, and automatically photographs a subject at a predetermined size when a shutter release button is depressed halfway.

However, according to such a construction, in the case of photographing a moving subject whose distance from an imager is changing, the position of the subject will be different before and after pressing the shutter release button. Therefore, a user may not photograph a subject in the intended composition that the user recognized before pressing the shutter release button halfway.

SUMMARY OF THE INVENTION

An object of the present invention is to provide an imager that can photograph a subject in a desired composition and display photographed images as through images on a display when a distance to a subject varies.

An imager is provided having an image-capturing device, a display, and a view angle controller. The image-capturing device captures a subject image and outputs an image signal. The display displays a through image consisting of multiple images continuously displayed. The view angle controller controls a view angle of an image so that a ratio of an area of a subject in an area of an image is maintained at a certain value when the display displays a through image.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
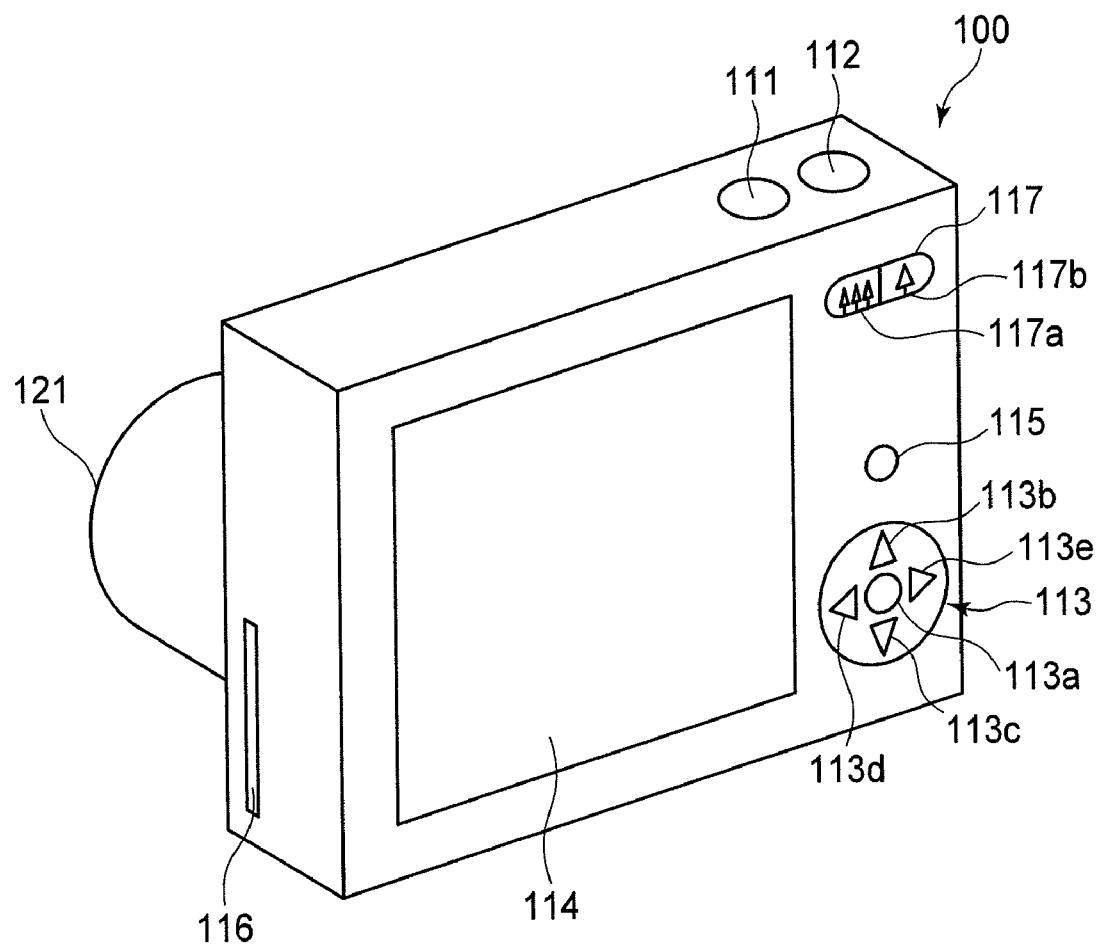
FIG. 1 is a perspective view of the back of a digital camera having the imager according to the embodiment of the present invention.

The present invention is described below with reference to the embodiment shown in the drawings.

Figure 2:
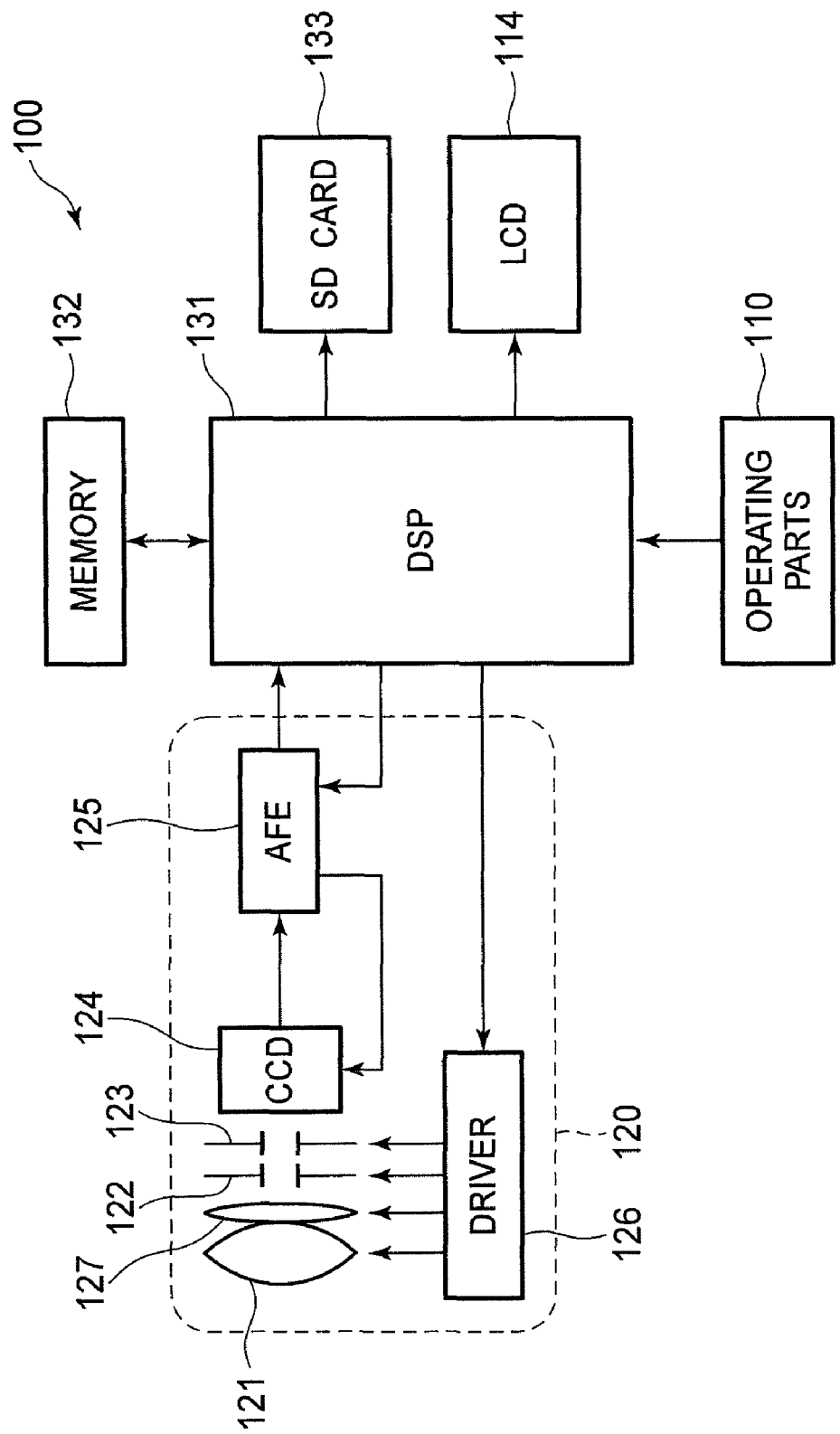
FIG. 2 is a block diagram of the digital camera.

A digital camera 100, which is an imager according to the embodiment, is described with reference to FIGS. 1 and 2. The digital camera 100 is, for example, a compact camera.

The digital camera 100 is mainly comprised of a DSP 131 that controls the digital camera 100, various operating components 110 that are used to operate the digital camera 100, a photographing member 120 that converts a subject image to a digital signal, a memory 132 that stores data sent from the DSP 131, an SD card 133 that stores photographed images, and an LCD 114 that displays photographing conditions and photographed images. The DSP 131 constitutes part of a view angle controller.

The photographing member 120 is mainly comprised of a photographing lens 121, a shutter 123, an aperture 122, a CCD 124, an AFE (Analog Front End) 125, and a driver 126 that drives the photographing Lens 121, the shutter 123, and the aperture 122.

The photographing lens 121 comprises a zoom optical system 127 that controls a view angle, and a focusing optical system that focuses on a subject. The zoom optical system 127 constitutes part of a view angle controller. The driver 126 controls the position of the focusing optical system so that focus of the photographing lens 121 is adjusted to form a subject image on an imaging area of the CCD 124. The aperture 122 controls a beam of light running from the photographing lens 121 to the CCD 124 so as to control the amount of light a subject image forms on the imaging area. The shutter 123 controls the period of time in which a subject image is illuminated on the imaging area. The CCD 124 converts a subject image focused on the imaging area to an analog image signal and sends it to the AFE 125. The AFE 125 adjusts the gain and other aspects of the analog image signal, converts it to a digital image signal, and then sends it to the DSP 131. The driver 126 controls the position of the focusing system, size of the aperture 122, and shutter speed according to signals received from the DSP 131.

The DSP 131 measures the amount of light of a subject, which is included in its digital image signal. The DSP 131 calculates an exposure value based on the amount of light, and calculates a shutter speed and an aperture value, i.e. an F-number, using the exposure value. After that, it sends the shutter speed and F-number to the driver 126. Moreover, it determines the appropriate position of the focusing system using the received digital image signal and sends the coordinates of the appropriate position of the focusing system to the driver 126. After the DSP 131 receives the digital image signal from the AFE 125, it adjusts the white balance of the image before sending the adjusted image as a through image to the LCD 114. The through image consists of multiple still images, but is perceived as a moving image by a user.

During photographing, the DSP 131 processes the image of a digital image signal and creates a photographic image. The photographic image is stored in the SD card 133 and displayed on the LCD 114.

The memory 132 is used as a working memory and stores data temporarily when the DSP 131 executes these calculations and carries out image processing. The memory 132 stores the initial value of a view angle and the size of the CCD 124. The initial value of view angle is a main subject area ratio that is calculated by dividing an area of a subject with an area a user desires to photograph. The area of a subject is described hereinafter. The size of the CCD 124 is the vertical pixel number and horizontal pixel number of the CCD 124.

The DSP 131 executes a face-detecting process in which the position and dimensions of a face included in the photographic image created from the digital image signal are detected. The detected position and dimensions of a face are indicated on the through image using an indicating frame. The main subject is very likely to be the subject that the camera is aimed at by the user.

In the case where there is only one detected face, the DSP 131 focuses on the detected face, calculates its respective exposure value, and photographs it. After that, the DSP 131 adjusts the white balance of the photographed image while placing priority on the detected face, and then outputs the image data. Therefore, a photographic image is created such that its focus, exposure, and white balance are properly adjusted with respect to the detected face.

In the case where the face-detecting process detects more than one face, the DSP 131 executes one of first to third main-subject selectors so that it selects only one face as a main subject among the multiple detected faces. Then, the DSP 131 creates a photographic image such that its focus, exposure, and white balance are properly adjusted with respect to the selected face.

The first main-subject selector selects a main subject in consideration of the size and position of a displayed face. Described in detail, it selects a displayed face near the center of an image as a main subject, or a face that is the largest among all displayed faces.

The second main subject selector uses a face-detecting function. The face-detecting function recognizes a face registered previously in the digital camera, and then detects the registered face as the main subject from among all displayed faces. The digital camera 100 comprises a face-registering mode that registers a face. A user sets the digital camera 100 to the face-registering mode using the various operating components 110, and photographs the face desired to be registered. The DSP 131 registers the photographed face and stores it into the memory 132. When the digital camera 100 proceeds with the face detecting function, the DSP 131 preferentially selects the face registered in the memory 132 from among all faces contained in the newly photographed image.

The third main-subject selector selects the registered face as a main subject among all displayed faces using the various operating components 110.

The LCD 114 has a rectangular screen with an aspect ratio of 3 to 4, which is the same as a photographic image. The LCD 114 is provided on the central part of the back side of the digital camera 100, such that its longitudinal direction extends parallel to the longitudinal (left to right) direction of the digital camera 100 (See FIG. 1). Images captured through the photographing lens 121, photographed images, through images, and a variety of configuration data of the digital camera can be displayed on the LCD 114. The through image is sent from the DSP 131.

The various operating components 110 include a main power button 111, a release button 112, a cross key 113, a best-framing button 115, and zoom lever 116.

The main power button 111 is a push switch projecting from the top of the digital camera 100. The digital camera 100 is powered when a user depresses the main power button 111. The digital camera 100 is powered off when a user depresses the main power button 111 while the digital camera 100 is powered.

The release button 112 is a two-stage push switch that is provided on the top surface of the digital camera 100. The digital camera 100 executes photometry, distance surveying and focusing when a user depresses the release button 112 only halfway. Otherwise, when the release button 112 is fully depressed, the digital camera 100 captures an image.

The cross key 113 is a rocker switch provided on the back of the digital camera 100. An OK button 113a is placed at the center of the cross key 113. An upward button 113b and a downward button 113c are placed at the top and bottom of the cross key 113. A leftward button 113d and a rightward button 113e are placed at the left and right side of the cross key 113. When a user operates the cross key 113, the operating state of the digital camera 100 is set to the photographing mode so that the LCD 114 displays dialog for setting the photographing mode. A user operates the cross key 113 so as to select a desired photographing mode among multiple photographing modes.

The best-framing button 115 is operated so as to change the operating mode of the digital camera 100 to the best-framing mode. When a user depresses the best-framing mode button 115, a signal is sent to the DSP 131, which then sets the operating mode of the digital camera 100 to the best-framing mode. In the best framing mode, the digital camera 100 changes the view angle according to the displacement of the subject, so that the area of the subject is maintained constant in a photographic image or a through image.

The zoom lever 117 is a rocker switch provided on the back of the digital camera 100, and comprises a wide-angle button 117a and a telephoto button 117b. When a user depresses the wide-angle button 117a or the telephoto button 117b, the driver 126 moves the zoom optical system 127. When a user depresses the wide-angle button 117a, the driver 126 moves the zoom optical system 127 so as to widen the view angle of the photographing lens 121. When a user depresses the telephoto button 117b, the driver 126 moves the zoom optical system 127 so as to narrow the view angle of the photographing lens 121.

On the other hand, a cutout zoom may be preceded by using the wide-angle button 117a or the telephoto button 117b. As regards to the cutout zoom, when a user depresses the wide-angle button 117a or the telephoto button 117b, the driver 126 changes the position of a cutout, i.e., trims a photographed image so as to widen or narrow its view angle.

The SD card 133 is detachably stored in a card slot 116 that is provided on the side of the digital camera 100. A user can access the SD card 133 and change it from the outside of the digital camera 100.

Figure 3:
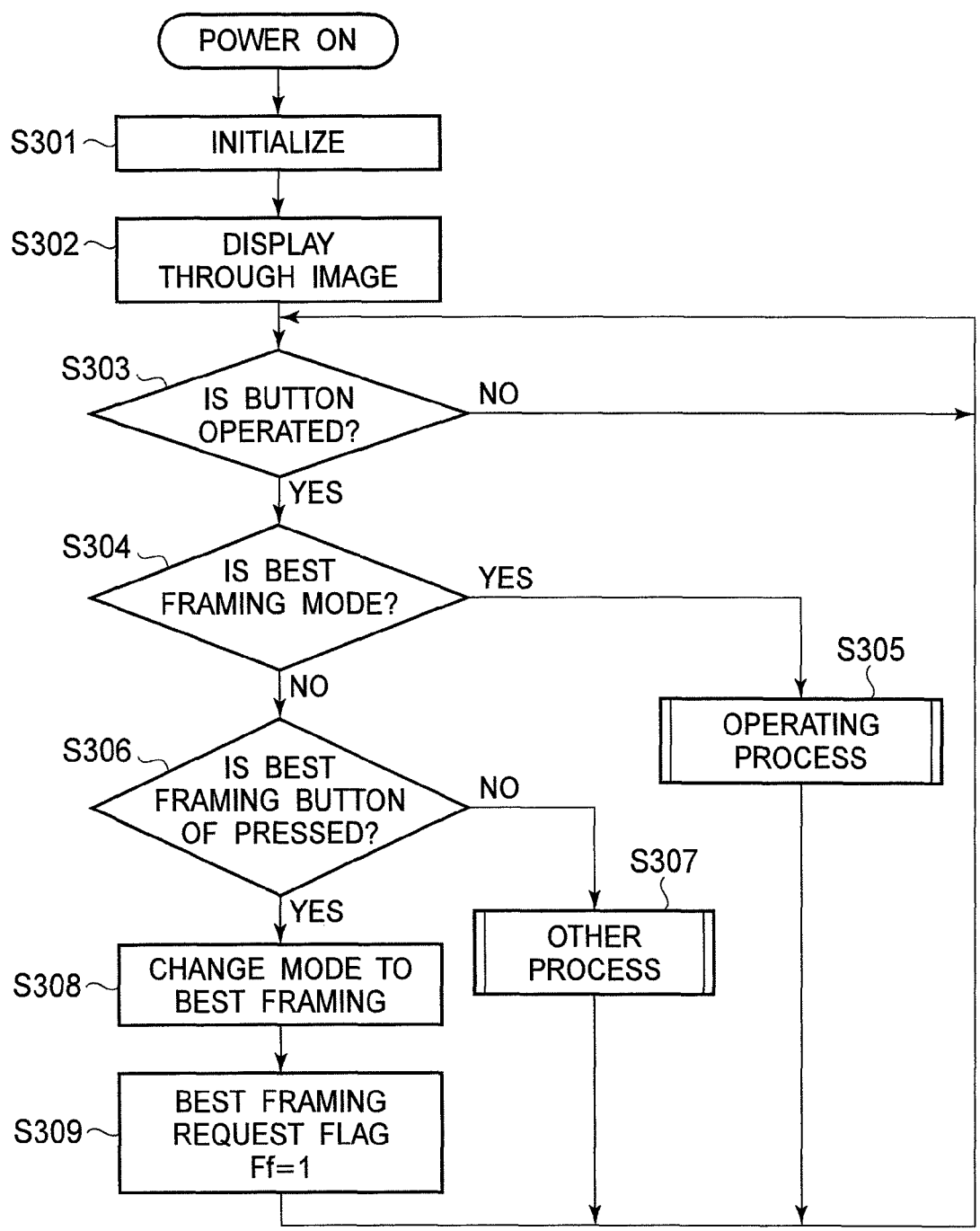
FIG. 3 is a flowchart of a main process.

The main process is described hereinafter with reference to FIG. 3. The main process starts when the digital camera 100 is powered on.

In Step S301, the functioning system of the digital camera 100 is initialized. For example, a protective cover of the photographing lens 121 is opened and the photographing lens 121 is extended out from the body of the digital camera 100 so as to enable photographing of a subject.

In Step S302, a frame-updating process, which is described hereinafter, is carried out so that a through image is displayed on the LCD 114. After that, the frame-updating process is periodically repeated every several dozen milliseconds, e.g. 1/30 or 1/60 second.

In Step S303, whether or not the various operating components 110 are operated is determined. In the case when they are operated, the process proceeds to Step S304. In the case when they are not operated, the process repeats Step S303 again, and waits for the operation of the various operating components 110.

In Step S304, whether or not the digital camera 100 is set to the best-framing mode is determined. In the case when it is set to the best-framing mode, the process proceeds to Step S305 and the operation of the various operating components 110. The operating process of the various operating components 110 is described hereinafter. In the case when it is not set to the best-framing mode, the process proceeds to Step S306.

In Step S306, whether or not the best-framing button is depressed is determined. In the case when it is not depressed, the process proceeds to Step S307 and another process, e.g. a process of displaying an image stored in the SD card 133 on the LCD 114. In the case when the best-framing button 115 is depressed, the process proceeds to Step S308.

In Step S308, the operating mode of the digital camera 100 is set to the best-framing mode.

In the next step, Step S309, the best-framing request flag Ff is set to one.

After processing Steps S305, S307, and S309, the process returns to Step S303 and waits until the various operating components 110 are operated.

While the digital camera 100 is powered on, the main process is proceeds.

Figure 4:
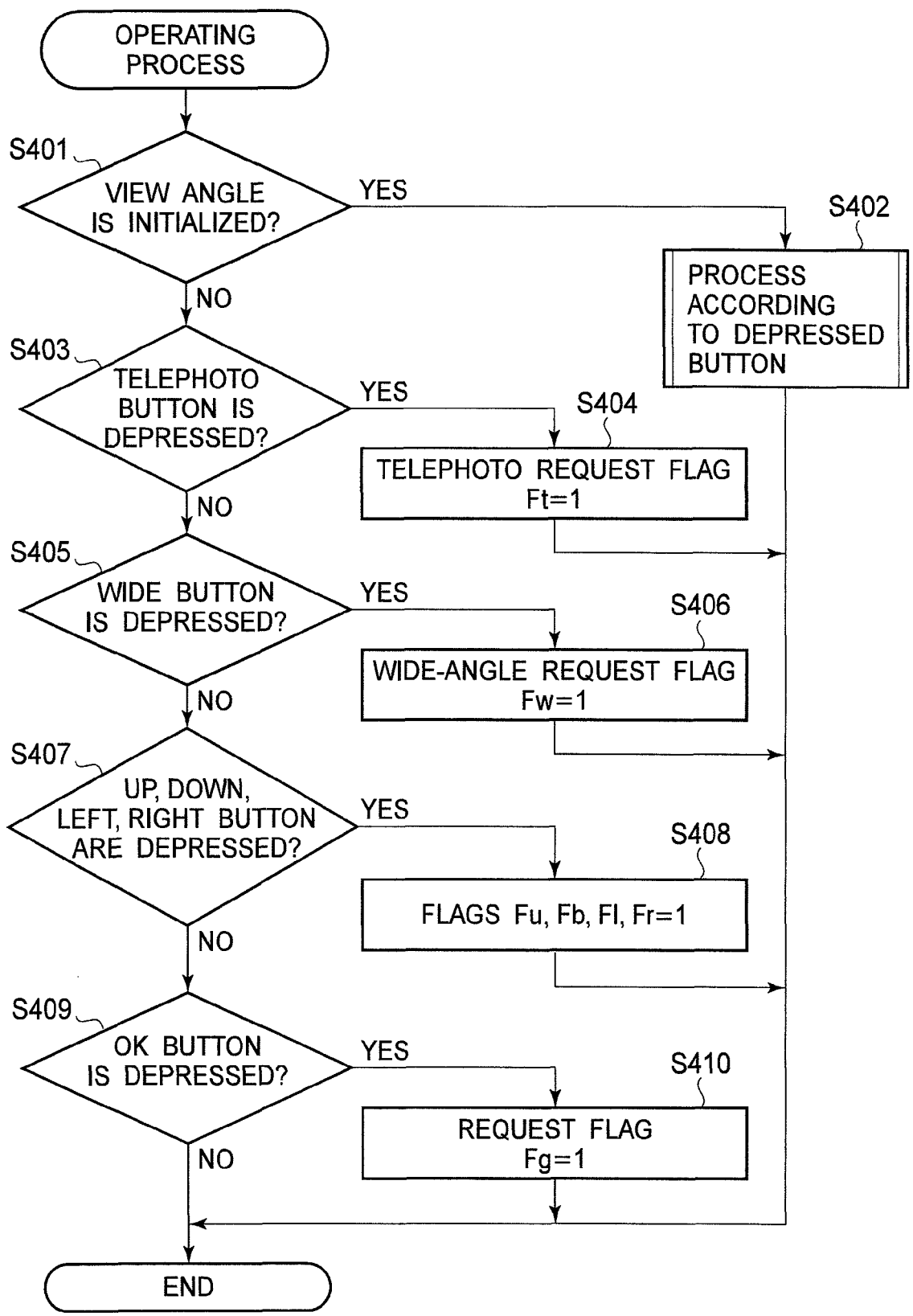
FIG. 4 is a flowchart of an operating process.

The operating process of the various operating components is described hereinafter with reference to FIG. 4. The operating process of the various operating components commences in Step S305 of the main process.

In Step S401, whether or not a view angle initializing end flag Fe is set to one is determined. The view angle initializing end flag Fe indicates that an initial value of view angle is stored in the memory 132. In the case that it is one, the initial value of view angle is set and stored in the memory 132.

In the case that it is one, i.e., the memory 132 stores the initial value of view angle, the process proceeds to Step S402 and another process is carried out, e.g. a process for displaying an image stored in the SD card 133 on the LCD 114. After that, the process ends. In the case that it is not one, i.e., the memory 132 does not store the initial value of view angle, the process described in Steps S403 to S408 is carried out.

In Step S403, whether or not the telephoto button 117b of the zoom lever 117 is depressed is determined. In the case that it is depressed, the process proceeds to Step S404. In the case that it is not depressed, the process proceeds to Step S405.

In Step S404, a telephoto request flag Ft is set to one.

In Step S405, whether or not the wide-angle button 117a of the zoom lever 117 is depressed is determined. In the case that it is depressed, the process proceeds to Step S406. In the case that it is not depressed, the process proceeds to Step S407.

In Step S406, a wide-angle request flag Fw is set to one.

In Step S407, whether or not the upward button 113b, the downward button 113c, the leftward button 113d or the rightward button 113e is depressed is determined. In the case that one of the four is depressed, the process proceeds to Step S408. In the case that none of the four are depressed, the process proceeds to Step S409.

In Step S408, an upward button flag Fu, a downward button flag Fb, a leftward button flag Fl or a rightward button flag Fr is set to one, according to the depressed button. After that, the process ends.

In Step S409, whether or not the OK button 113a is depressed is determined. In the case that it is depressed, the process proceeds to Step S410. In the case that it is not depressed, the process ends.

In Step S410, a view angle initializing end request flag Fg is set to one, and the process ends.

Figure 5:
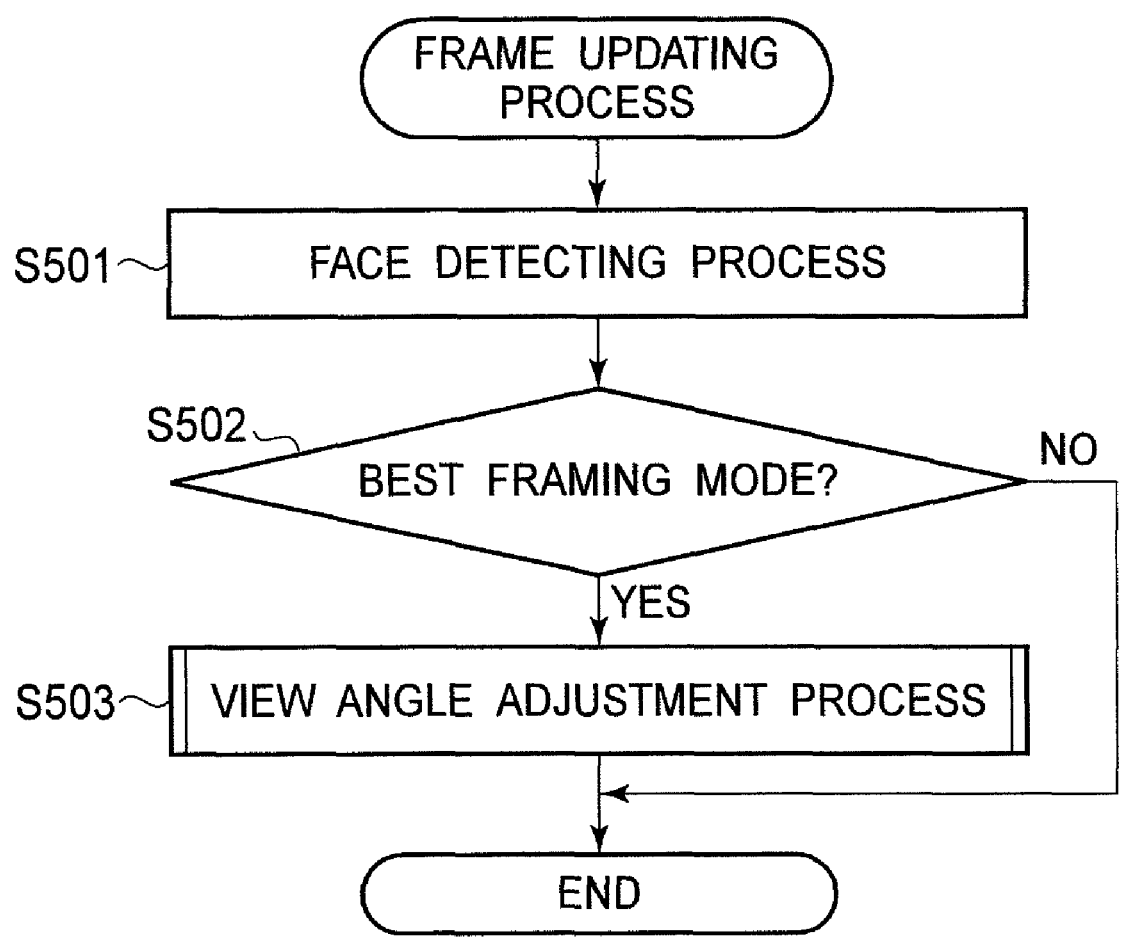
FIG. 5 is a flowchart of a frame updating process.

The frame-updating process is described hereinafter with reference to FIG. 5. The frame-updating process is periodically repeated after it begins in Step S302 of the main process.

In Step S501, the face-detecting process commences. Therefore, faces present in a through image are detected and a main subject is selected. The face of a main subject and its perimeter is bounded by a main indicating frame 811. The other faces are bounded by secondary indicating frames 812. All of the detected faces are displayed on the LCD 114 (refer to FIG. 8).

In Step S502, whether or not the digital camera 100 is set to the best-framing mode is determined. In the case when it is set to the best-framing mode, the process proceeds to Step S503 and the view angle adjustment calling process commences. The process ends after the view angle adjustment calling process commences. In the case when the digital camera 100 is not set to the best-framing mode in Step S502, the frame-updating process ends.

Figure 6:
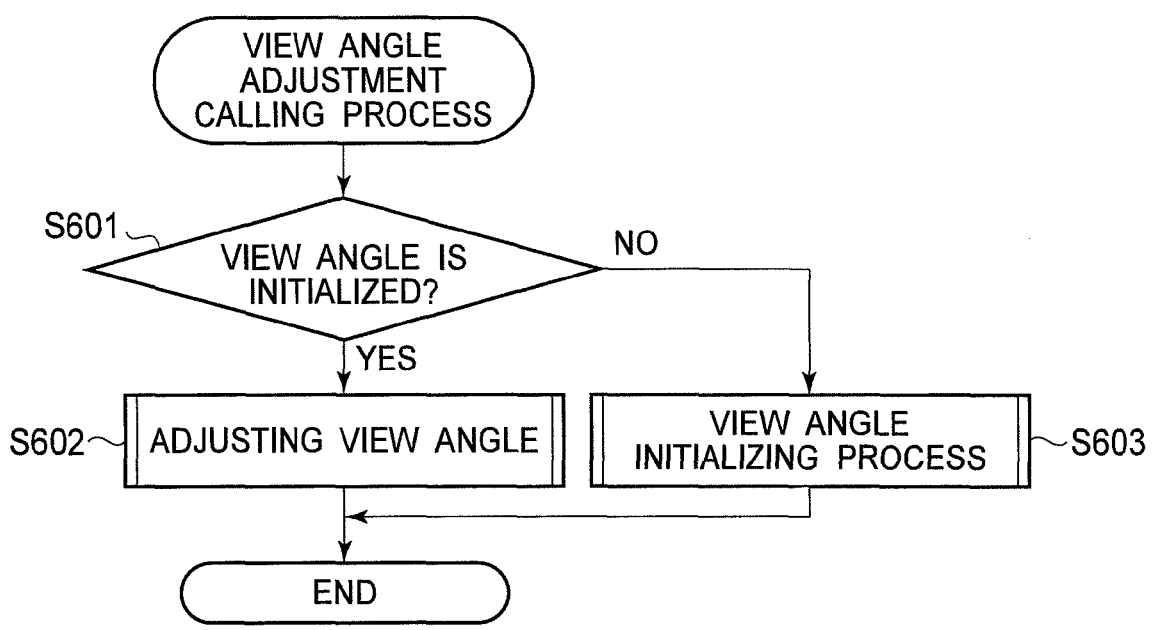
FIG. 6 is a flowchart of a view angle adjustment calling process.

The view angle adjustment calling process is described hereinafter with reference to FIG. 6. The view angle adjustment calling process commences in Step S503 of the frame-updating process.

In Step S601, whether or not a view angle initializing end flag Fe is set to one is determined. In the case when it is not one, the process proceeds to Step S603 and the view angle initializing process commences. In the case when it is one, the process proceeds to Step S602 and the view angle adjusting process commences.

When the view angle initializing process and the view angle adjusting process end, the view angle adjustment calling process also ends and the frame-updating process continues to Step S503.

Figure 7:
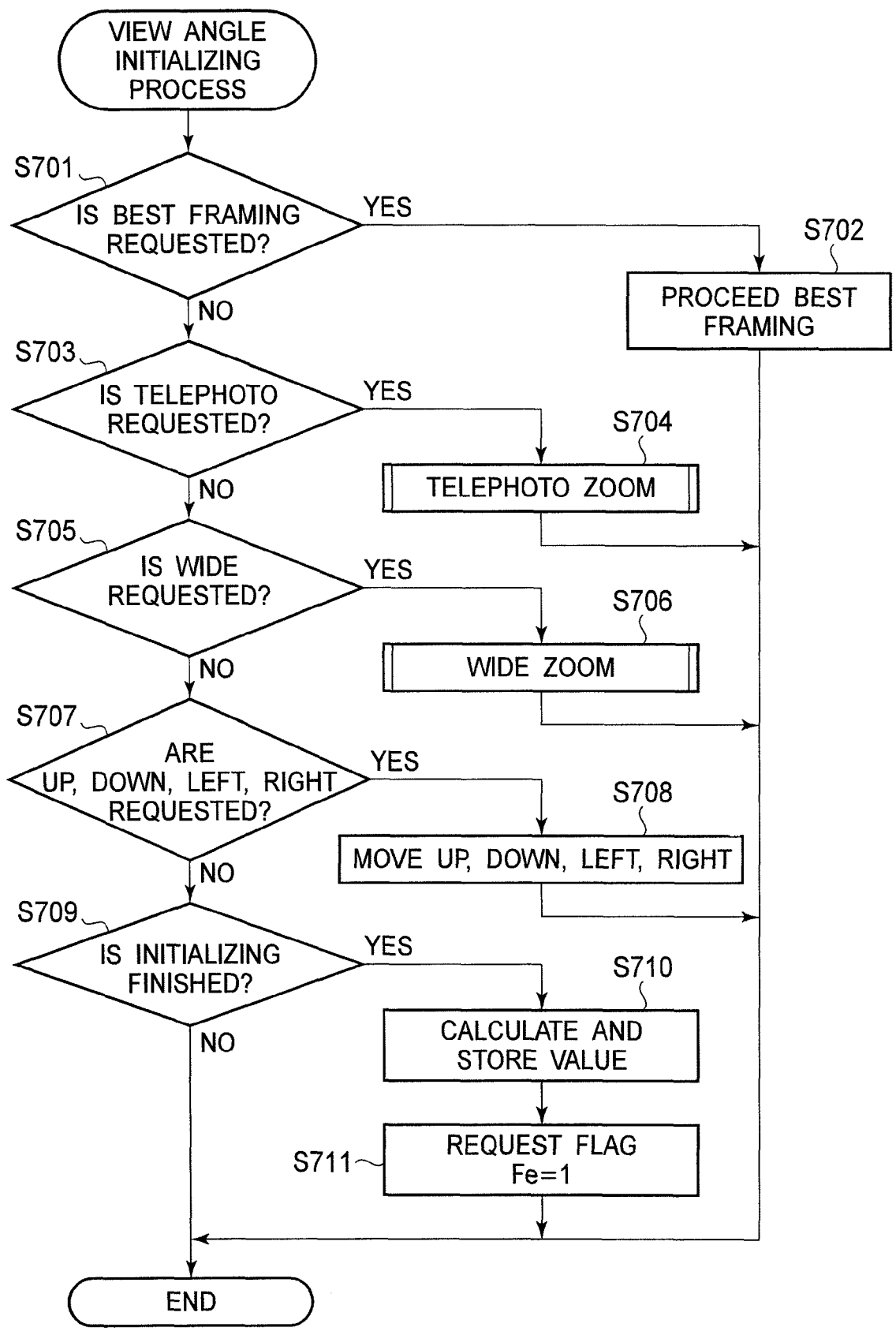
FIG. 7 is a flowchart of a view angle initializing process.

The view angle initializing process is described hereinafter with reference to FIGS. 7-9. The view angle initializing process commences in Step S603 of the view angle adjustment calling process, and determines what view angle to use when photographing in the best-framing mode, i.e., what is the proper size of the main subject in a through image or photographic image.

In Step S701, whether or not the best-framing request flag Ff is one is determined. In the case it is one, the process proceeds to Step S702 and the area bounded by the best-framing frame 801 in FIG. 8 is displayed on the entire LCD 114 (refer to FIG. 9). In the entire image captured by the CCD 124, the region surrounded by the best-framing frame 801 indicates the view angle for use when photographing in the best-framing mode. The size of frame 801 is determined so as to contain a face and upper body based on the area of the face. Hereinafter, a whole image photographed by the CCD 124 will be referred to as an original image.

In Step S701, in the case when the best-framing request flag Ff is not one, the process proceeds to Step S703.

In Step S703, whether or not the telephoto request flag Ft is set to one is determined. In the case when the telephoto request flag Ft is one, the process proceeds to Step S704 and a telephoto zoom process that will be described hereinafter. The telephoto zoom process narrows a view angle, i.e., moves the zoom optical system 127 to the telephoto side. In the case the telephoto request flag Ft is not one, the process proceeds to Step S705.

In Step S705, whether or not the wide-angle request flag Fw is one is determined. In the case when the wide-angle request flag Fw is one, the process proceeds to Step S706 and a wide-angle zoom process commences, which will be described hereinafter. The wide-angle zoom process widens a view angle, i.e., moves the zoom optical system 127 to the wide-angle side. In the case the wide request flag Fw is not one, the process proceeds to Step S707.

In Step S707, whether or not the upward button flag Fu, the downward button flag Fb, the leftward button flag Fl or the rightward button flag Fr is one, is determined. In the case one of these flags is one, the process proceeds to Step S708. In the case none of these flags is set to one, the process proceeds to Step S709.

In Step S708, an image displayed on the LCD 114 is moved a distance of 1 pixel from the position of an original image, depending on the value of these flags. In the case that the upward button 113b, the downward button 113c, the leftward button 113d or the rightward button 113e is continuously depressed, for example for several hundred milliseconds (200-300 milliseconds), i.e. the upward button flag Fu, the downward button flag Fb, the leftward button flag Fl or the rightward button flag Fr is set to one for several hundred milliseconds (200-300 milliseconds), an image displayed on the LCD 114 is moved a distance of ten pixels, for example, from the position of the original image. In the case that the upward button flag Fu is one, the display area of the LCD 114 is moved in the upward direction away from the position of the displayed image. In the case that the downward button flag Fb is one, the display area of the LCD 114 is moved in the downward direction away from the position of the displayed image. In the case that the leftward button flag Fl is one, the display area of the LCD 114 is moved in the leftward direction away from the position of the displayed image. And in the case that the rightward flag Fr is one, the display area of the LCD 114 is moved in the rightward direction away from the position of the displayed image. After that, the view angle initializing process ends.

By repeating the view angle adjusting process and Steps S703 to S708 of the view angle initializing process in the frame-updating process that is carried out repeatedly, a region of an image displayed on the LCD 114 is aligned with a region a user desires to photograph. That is, a size of a main subject is adjusted so that it conforms to a size a user desires.

In Step S709, whether or not a view angle initializing end request flag Fg is one is determined. The case that the view angle initializing end request flag Fg is one occurs when a user depresses the OK button 113a in Step S409 in the operating process of the various operating components. At that moment, it is determined that a region a user desires to photograph conforms to a view angle of an image displayed on the LCD 114. The process then proceeds to Step S710.

In Step S710, a region of an image currently displayed on the LCD 114 is regarded as a region a user desires to photograph, and an area bounded by a main indicating frame 811 is divided by an area a user desires to photograph, so that the main subject area ratio is calculated. After that, the main subject area ratio is stored in the memory 132 as the initial value of view angle.

Then, the view angle initializing end flag Fe is set to one in Step S711 and the view angle initializing process ends.

In Step S709, in the case that the view angle initializing end request flag Fg is not one, the process ends.

Figure 10:
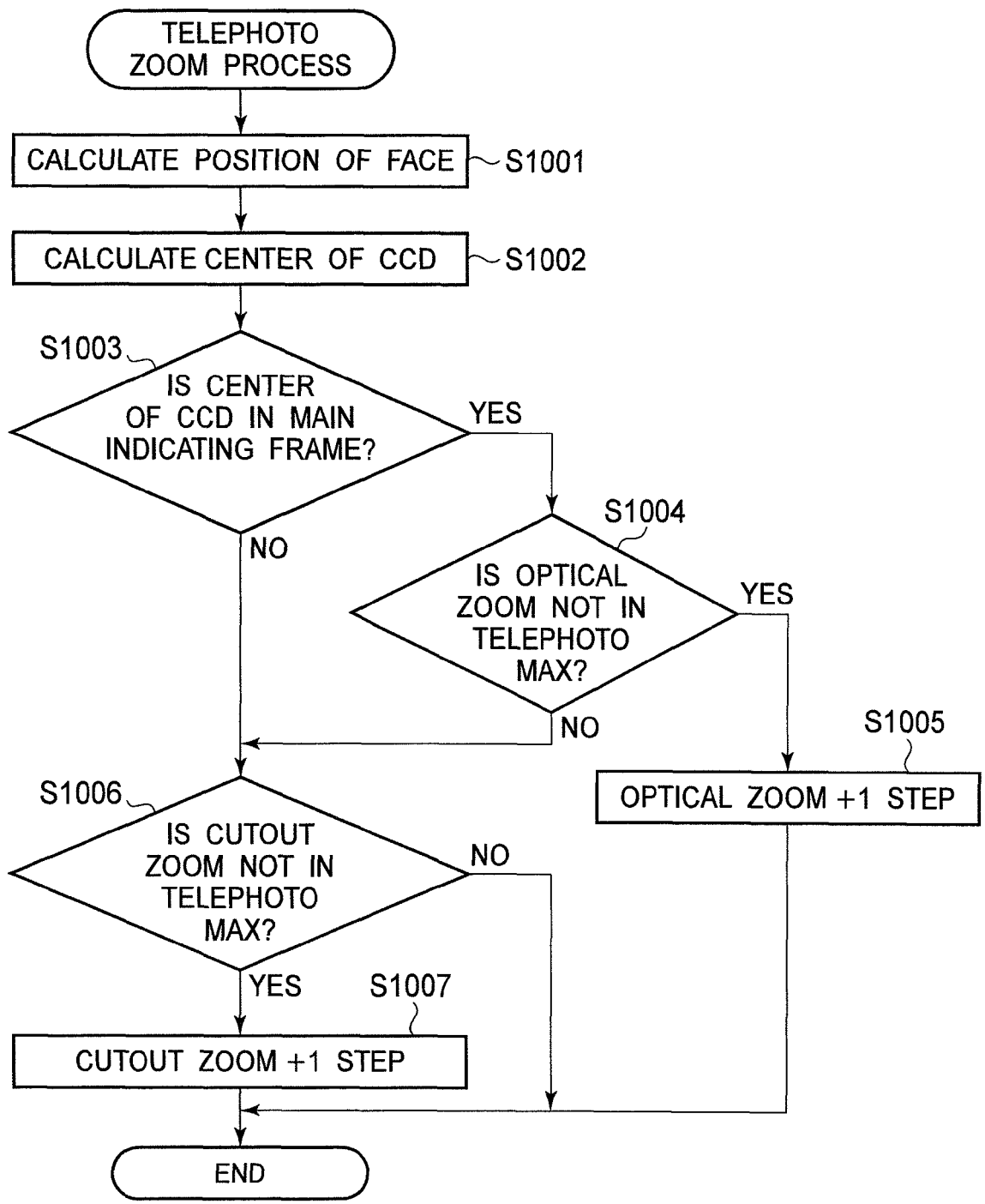
FIG. 10 is a flowchart of a telephoto zoom process.

The telephoto zoom process is described hereinafter with reference to FIG. 10. The telephoto zoom process, which commences in Step S704 of the view angle initializing process and Step S1206 of the view angle adjusting process, narrows a view angle by moving either the zoom optical system 127 or the position of the cutout zoom to the telephoto side.

In Step S1001, a position and region of the main indicating frame 811 currently displayed on the LCD 114 are calculated for an original image.

In Step S1002, a position that corresponds to the center of the CCD 124 on an original image is calculated.

In Step S1003, whether or not the center of the CCD 124 is in a region of the main indicating frame 811 on an original image is determined. In the case that the center of the CCD 124 is in a region of the main indicating frame 811, it is determined that the center of an image displayed on the LCD 114 is in a certain region that is intersected by the optical axis. In this case, if a view angle is narrowed by the zoom optical system 127, the subject image will not fall outside of the view angle. Otherwise, in the case that the center of the CCD 124 is not in a region of the main indicating frame 811, when a view angle is narrowed by the zoom optical system 127 the subject image may fall outside of the view angle. In the case that the center of the CCD 124 is in a region of the main indicating frame 811, the process proceeds to Step S1004. In the case that the center of the CCD 124 is not in a region of the main indicating frame 811, the process proceeds to Step S1006.

In Step S1004, whether or not the zoom optical system is at the maximum telephoto position is determined. In the case it is not, the process proceeds to Step S1005 because the telephoto position of the zoom optical system 127 can be moved increased. However, in the case it is in the maximum telephoto position, the process proceeds to Step S1006 because the telephoto position of the zoom optical system 127 cannot be increased anymore.

In Step S1005, the zoom optical system 127 is moved by one step toward the telephoto side. After that, the process ends.

In Step S1006, whether or not the cutout zoom is at the maximum telephoto position is determined. In the case it is not, the process proceeds to Step S1007 because the telephoto position of the cutout zoom can be increased. However, in the case it is at the maximum telephoto position, the process ends without zooming because the telephoto position of the cutout zoom cannot be increased anymore.

In Step S1005, the position of the cutout zoom is moved by one step toward the telephoto side. After that, the process ends.

Owing to the telephoto zoom process, a subject image can be magnified in a photographed image without the subject image falling outside of the view angle. Additionally, image quality does not deteriorate because the view angle is narrowed by the zoom optical system 127 with respect to the cutout zoom.

Figure 11:
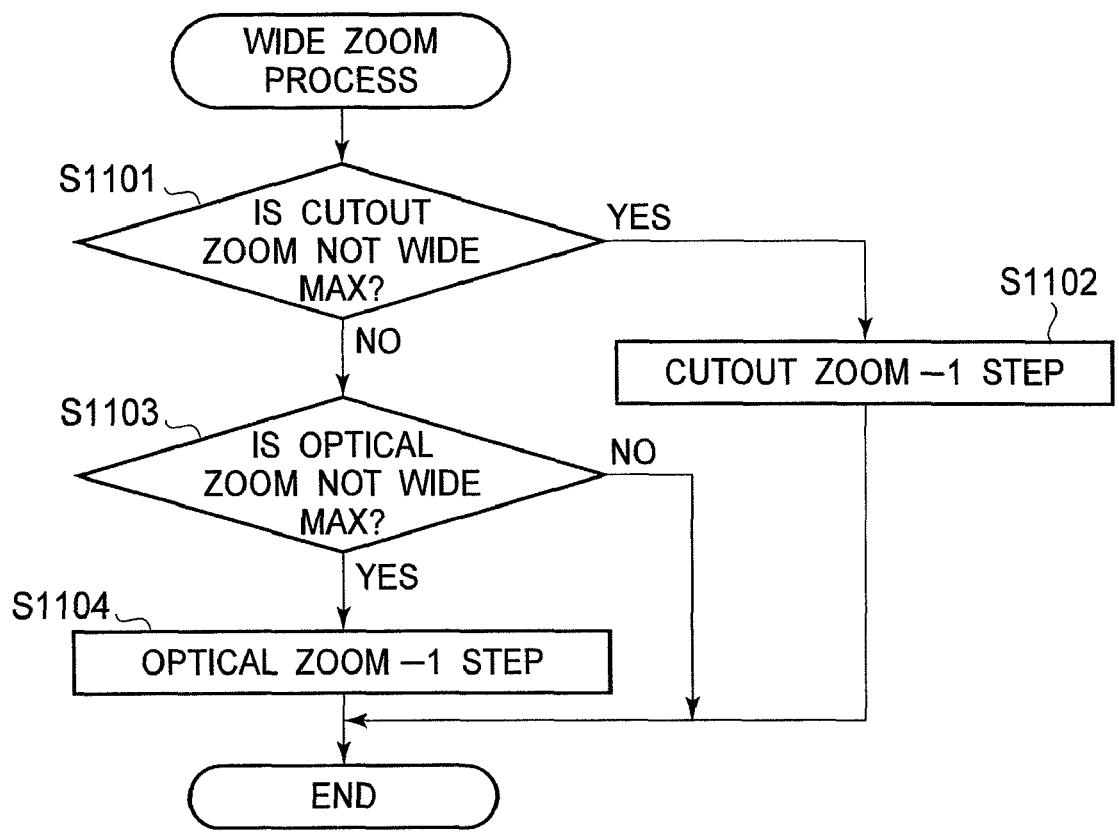
FIG. 11 is a flowchart of a wide-angle zoom process.

The wide-angle zoom process is described hereinafter with reference to FIG. 11. The wide zoom process, which commences in Step S706 of the view angle initializing process and Step S1204 of the view angle adjusting process, widens a view angle by moving either the zoom optical system 127 or the position of the cutout zoom toward the wide-angle side.

In Step S1101, whether or not the cutout zoom is in the maximum wide-angle position is determined. In the case it is not, the process proceeds to Step S1102 because the wide-angle position of the cutout zoom can be increased. However, in the case it is at the maximum wide-angle position, the process proceeds to Step S1103 because the wide-angle position of the cutout zoom cannot be increased anymore.

In Step S1102, the zoom optical system 127 is moved by one step toward the wide-angle side. After that, the process ends.

In Step S1103, whether or not the zoom optical system is in the maximum wide-angle position is determined. In the case it is not, the process proceeds to Step S1104 because the wide-angle position of the zoom optical system 127 can be increased. However, in the case it is at the maximum wide-angle position, the process ends without zooming because the wide-angle position of the cutout zoom cannot be increased anymore.

In Step S1104, the position of the cutout zoom is moved by one step toward the wide-angle side. After that, the process ends.

Image quality does not deteriorate because a view angle is widened by the zoom optical system 127 with respect to the cutout zoom.

Figure 12:
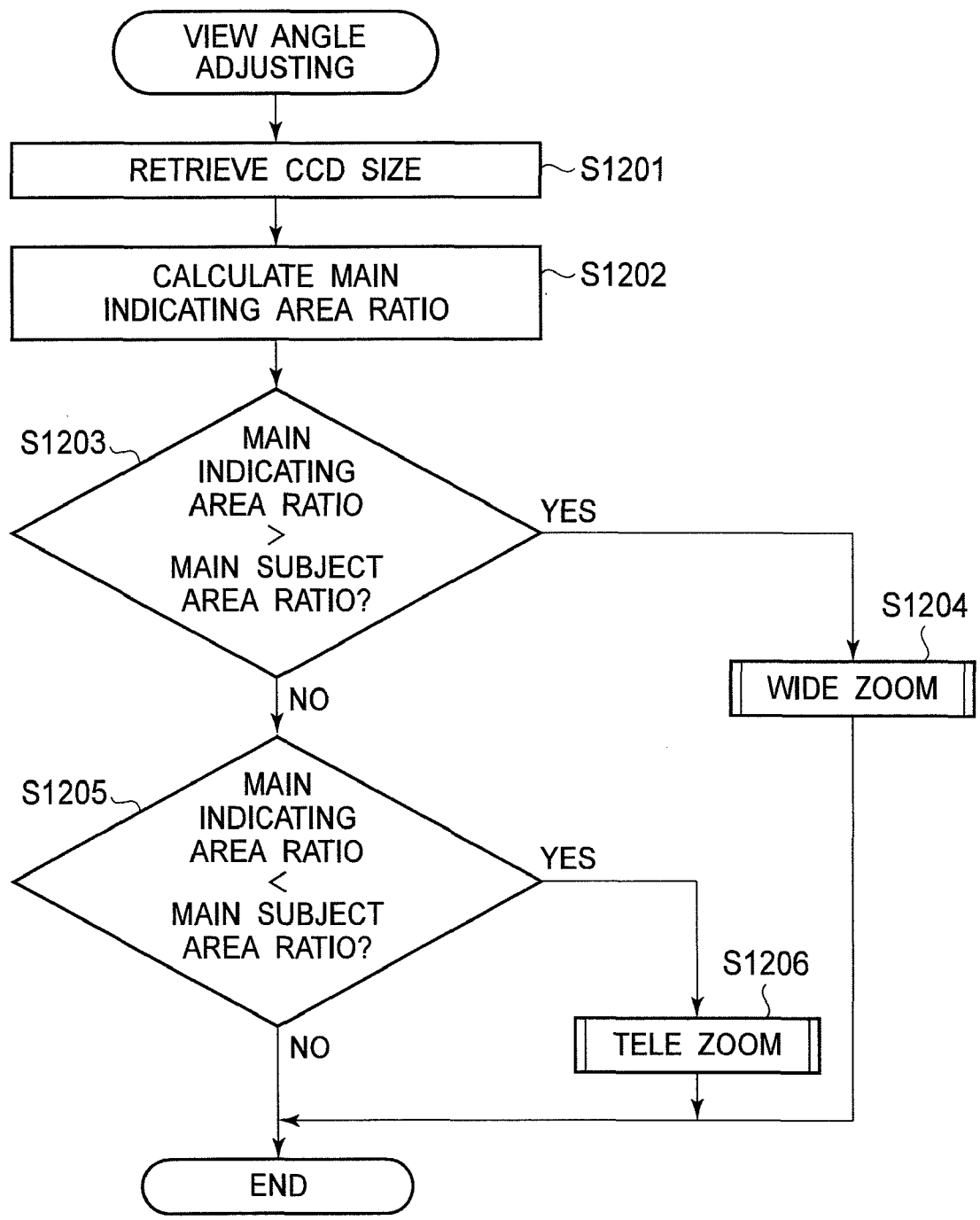
FIG. 12 is a flowchart of a view angle adjusting process.

The view angle adjusting process is described hereinafter with reference to FIGS. 12-14. The view angle adjusting process commences in Step S602 of the view angle adjustment calling process, and maintains a constant area for a subject image within a photographic image, even if the subject moves.

In Step S1201, the size of the CCD 124 is retrieved from the memory 132.

In Step S1202, the area of the main indicating frame 811 currently displayed on the LCD 114 is calculated and then divided by the area of the original image displayed on the LCD 114, so that the main indicating area ratio is calculated.

In Step S1203, the main indicating area ratio is retrieved from the memory 132, and it is determined whether or not the main indicating area ratio is larger than the main subject area ratio. In the case that it is larger, the process proceeds to Step S1204. In the case that it is not larger, the process proceeds to Step S1205.

Figure 13:
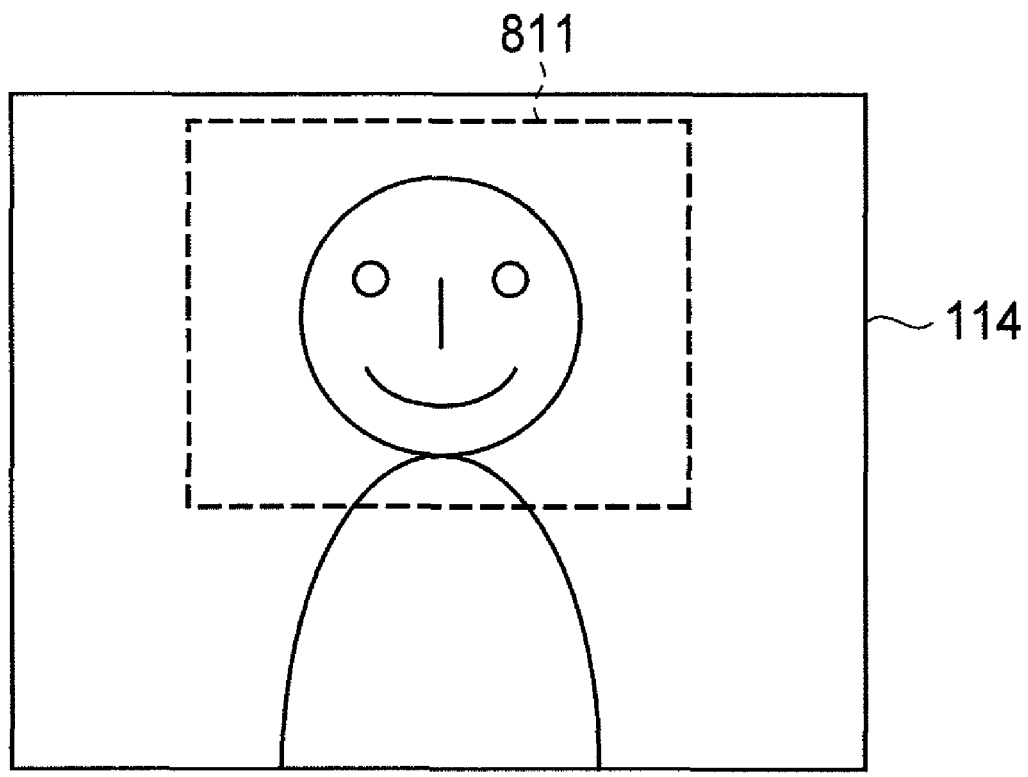
FIG. 13 is a schematic view of a display provided in the digital camera.

Referring to FIG. 13, when a subject approaches the digital camera 100, the area of a subject image displayed on the LCD 114 increases in size. In this case, the main indicating area ratio is larger than the main subject area ratio. Therefore, the wide-angle zoom process commences in Step S1204 and the view angle of an image displayed on the LCD 114 is widened by one step.

In Step S1205, whether or not the main indicating area ratio is smaller than the main subject area ratio is determined. In the case that it is smaller, the process proceeds to Step S1206. In the case that it is not smaller, the process ends.

Figure 14:
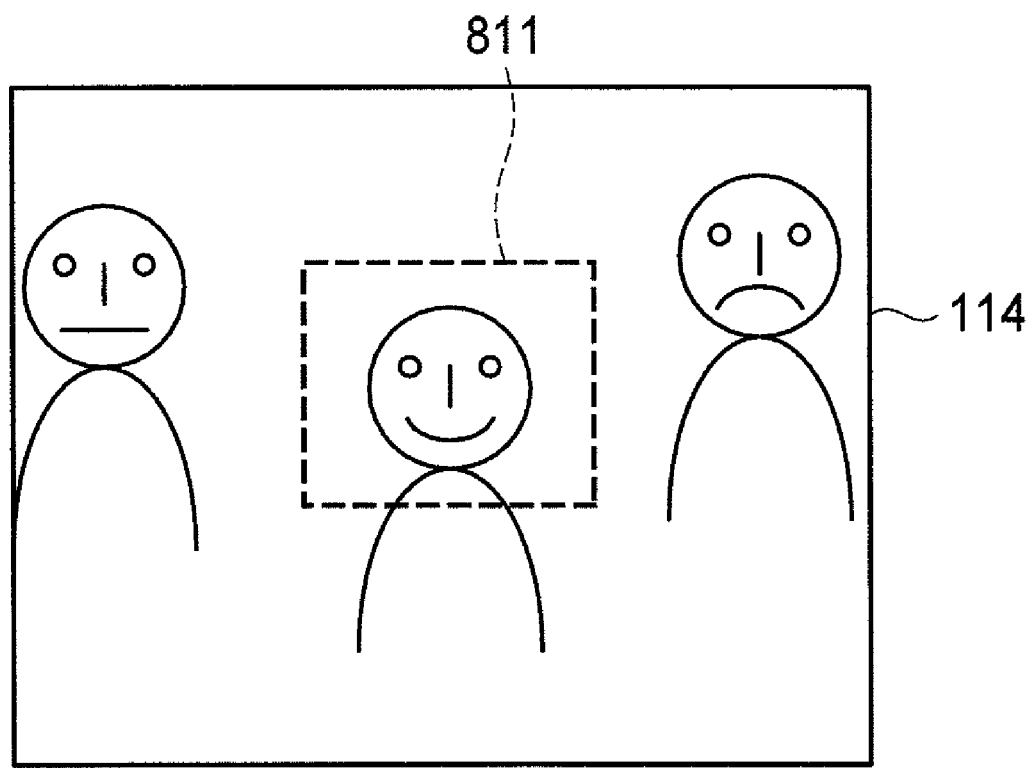
FIG. 14 is a schematic view of a display provided in the digital camera.

Referring to FIG. 14, when a subject moves away from the digital camera 100, the area of a subject image displayed on the LCD 114 decreases in size. In this case, the main indicating area ratio is smaller than the main subject area ratio. Therefore, the telephoto zoom process commences in Step S1206 and a view angle of an image displayed on the LCD 114 is narrowed by one step.

By repeating the view angle adjusting process in the frame updating process, which is carried out repeatedly, the main indicating area ratio is the same as the main subject area ratio. That is, a size of a main subject displayed on the LCD 114 conforms to the size that a user desires.

Figure 8:
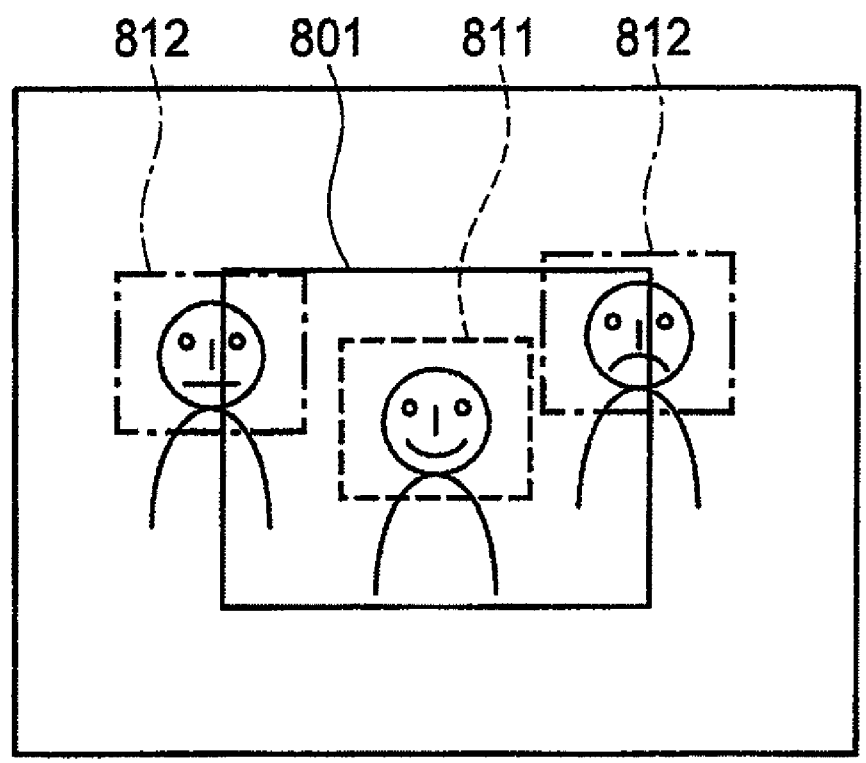
FIG. 8 is a schematic view of a display provided in the digital camera.
Figure 9:
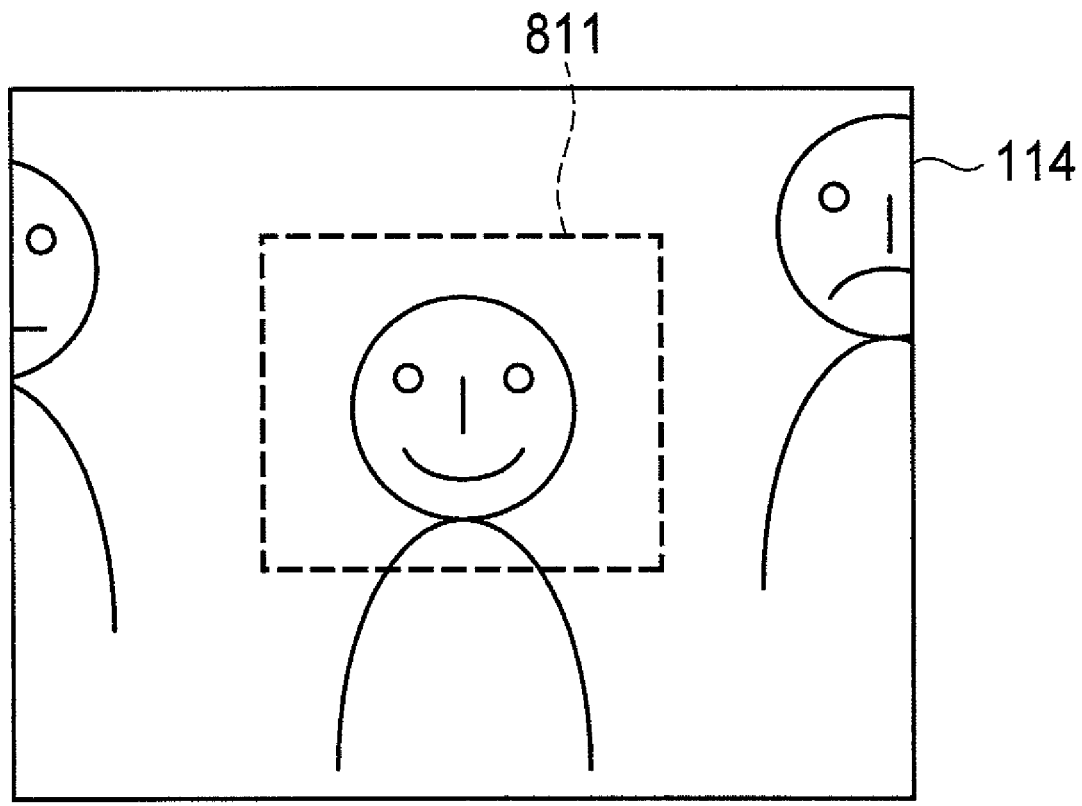
FIG. 9 is a schematic view of a display provided in the digital camera.

According to the view angle adjusting process, even if a subject moves, the size of a subject image displayed on the LCD 114 is kept constant (refer to FIG. 8). In this situation, when a user fully depresses the release button 112, a photographic image is created in which the size of a subject image is maintained at a desired size.

According to the embodiment, when a subject moves so as to change the distance between the digital camera 100 and the subject, a photographic image and a through image are created with the size of the subject image maintained at a desired size.

Note that the digital camera 100 may not have the CCD 124, it may have another image capturing device, such as CMOS.

In Step S1003 of the telephoto zoom process, it may be determined whether or not the position that is vertically slightly lower than the center of the main indicating frame 811 conforms to the center of the CCD 124 for an original image. In this case, the face of a subject is placed slightly higher than the center of the photographic image, so that a photographic image has a good composition. Moreover, in Step S1003, it may be determined whether the center of the main indicating frame 811 conforms to the center of the CCD 124 on an original image or not. It enables the determination to be made regarding whether or not the center of the main indicating frame 811 is on the optical axis of the photographing lens 121.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2008-321595 (filed on Dec. 17, 2008), which is expressly incorporated herein, by reference, in its entirety.

The invention claimed is:

1. An imager comprising:
   an image capturer that captures a subject image and outputs an image signal;
   a display that displays a through image consisting of multiple images continuously displayed;
   a view angle controller that controls a view angle of an image so that a ratio of an area of a subject to an area of an image is maintained at a certain value when said display displays the through image; and
   said view angle controller comprises a lens system and a zoom optical system that is provided in said lens system, and controls a view angle of an image with the zoom optical system when a subject is in a certain area that is intersected by the optical axis of the zoom optical system,
   said view angle controller further comprises a cutout zoom part that widens or narrows a partial image that is cut from an image output by said image capturer so that said view angle controller controls a view angle of an image, and controls a view angle of an image with the cutout zoom part when a subject is not in the certain area that is intersected by the optical axis of the zoom optical system,
   wherein whether or not the certain area is intersected by the optical axis of the zoom optical system is determined based on whether or not a center of the image capturer is within the certain area.

2. The imager according to claim 1, wherein the certain area comprises a face of the subject and a circumferential extent of the face.

3. The imager according to claim 1, further comprising a face detector that detects a size of a face that is included in an image, and said view angle controller adjusts a view angle of an image so that the size of a face is kept constant.

4. The imager according to claim 3, further comprising a face selector that selects a face from multiple faces included in an image, said face detector detecting the size of the face that is selected by said face selector.

5. The imager according to claim 4, wherein said face selector selects a face that is displayed near a center of an image.

6. The imager according to claim 4, wherein said face selector selects a face that is a largest of all displayed faces.

7. The imager according to claim 4, further comprising a face register that registers a face in the digital camera before photographing.

8. The imager according to claim 4, wherein said face selector selects a face previously registered in the digital camera.

9. The imager according to claim 1, further comprising a size selector that selects a certain value.

10. An imager comprising:
an image capturer that captures a subject image and outputs an image signal;
a display that displays a through image consisting of multiple images continuously displayed; and
a view angle controller that controls a view angle of an image so that a ratio of an area of a subject to an area of an image is maintained at a certain value when said display displays the through image;
wherein said view angle controller comprises a lens system, a zoom optical system that is provided in said lens system, and a cutout zoom part that widens or narrows a partial image that is cut from an image output by said image capturer so that said view angle controller controls a view angle of an image, widens a view angle of an image with the cutout zoom part when a ratio of an area of a subject to an area of an image is greater than a certain value, and widens a view angle of an image with the zoom optical system when the cutout zoom part is positioned at a maximum wide angle limit, and
wherein the view angle is Widened by the zoom optical system with respect to the cutout zoom part.

11. The imager according to claim 4, further comprising a face detector that detects a size of a face that is included in an image, and said view angle controller adjusts a view angle of an image so that the size of a face is kept constant.

12. The imager according to claim 10, further comprising a size selector that selects a certain value.

13. The imager according to claim 4, further comprising a face selector that selects a face of multiple faces included in an image, and a face detector detecting the size of the face that is selected by said face selector.

14. The imager according to claim 13, wherein said face selector selects a face previously registered in the digital camera.

15. An imager comprising:
an image capturer that captures a subject image and outputs an image signal;
a display that displays a through image consisting of multiple images continuously displayed; and
a view angle controller that controls a view angle of an image so that a ratio of an area of a subject to an area of an image is maintained at a certain value when said display displays the through image;
wherein said view angle controller comprises a lens system, a zoom optical system that is provided in said lens system, and a cutout zoom part that widens or narrows a partial image that is cut from an image output by said image capturer so that said view angle controller controls a view angle of an image, narrows a view angle of an image with the zoom optical system when a ratio of an area of a subject to an area of an image is smaller than a certain value, and narrows a view angle of an image with the cutout zoom part when the zoom optical system is positioned at a maximum telephoto limit, and
wherein the view angle is narrowed by the zoom optical system with respect to the cutout zoom part.

16. The imager according to claim 15, further comprising a face detector that detects the size of a face that is included in an image, and said view angle controller adjusts a view angle of an image so that the size of a face is kept constant.

17. The imager according to claim 15, further comprising a size selector that selects a certain value.

18. The imager according to claim 15, further comprising a face selector that selects a face of multiple faces included in an image, and a face detector detecting the size of the face that is selected by said face selector.

19. the imager according to claim 18, further comprising a size selector that selects a certain value.

* * * * *